Oct. 14, 1924.
F. A. GOODFELLOW
1,511,515
TERMINAL CHECK VALVE FOR MECHANICAL LUBRICATORS
Filed Sept. 9, 1922
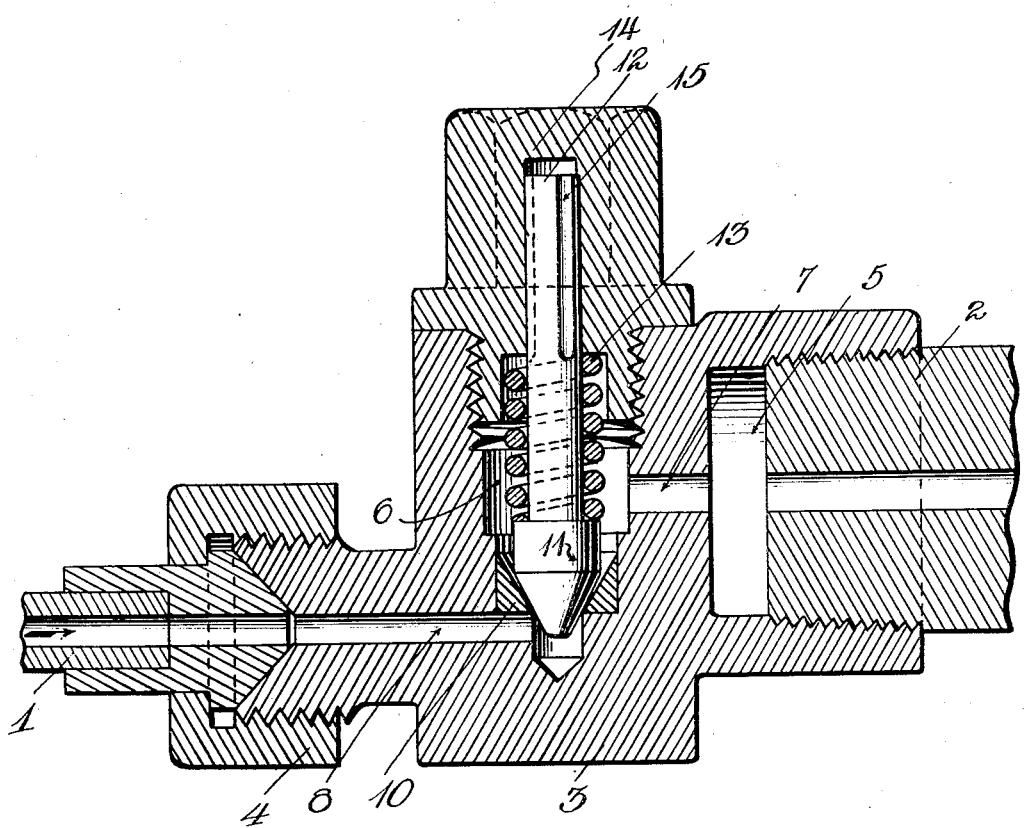
Inventor
F. A. Goodfellow
By
Attorney Patented Oct. 14, 1924.

1,511,515

UNITED STATES PATENT OFFICE.

FRANK A. GOODFELLOW, OF ALTOONA, PENNSYLVANIA.

TERMINAL CHECK VALVE FOR MECHANICAL LUBRICATORS.

Application filed September 9, 1922. Serial No. 587,243.

*To all whom it may concern:*

Be it known that I, FRANK A. GOODFELLOW, a citizen of the United States, residing at Altoona, in the county of Blair and State of Pennsylvania, have invented certain new and useful Improvements in Terminal Check Valves for Mechanical Lubricators, of which the following is a specification.

This invention relates to terminal check valves for mechanical lubricating systems and more particularly to check valves especially adapted to be associated with the lubricating systems of locomotives where relatively high pressures are involved.

As is well known to those familiar with the art, a certain amount of lubricating oil is injected into the steam pipe leading from the boiler to the cylinders for the purpose of lubricating the moving parts, particularly the valves, pistons, packing and all other wearing surfaces. At the point of injection there is a relatively high back pressure due to the steam pressure of the boiler and consequently a relatively high pump pressure must be used to force the oil into the steam pipe and past the holding means employed for normally seating the check valve as when the engine is drifting.

It is, therefore, one of the objects of the present invention to provide a simple and practical check valve for use in systems of the above character which may be inexpensively manufactured and assembled.

A further object is to provide a durable, reliable and efficient check valve which will prevent the flow of oil when the engine is drifting due to the suction exerted upon the outlet nozzle.

A further object is to provide a valve of the above character which is adapted to withstand the wear incident to the rough usage and the high pressures to which it is subjected, and to minimize the possibility of its getting out of order.

The invention accordingly consists of the features of construction, the combination of parts, and the unique relation of the various members and to the relative proportioning and disposition thereof, all as more clearly outlined hereinafter.

To enable others skilled in the art to which this invention relates to so comprehend the underlying features thereof, that they may embody the same by numerous modifications in structure and relation contemplated by this invention, drawings depicting a preferred form have been annexed as illustrating one embodiment and forming part of this disclosure in which there is shown a longitudinal sectional view of the complete device.

While this invention will be hereinafter described particularly with relation to its application to lubricating systems of locomotives, it is, of course, to be understood that without material modification or alteration the invention is applicable to other lubricating systems and uses as well.

Referring now to the drawing in detail, 1 indicates the inlet pipe adapted to be connected with any suitable source of supply such as a high pressure pump operated by the engine, and 2 indicates an outlet nozzle adapted to be placed in the steam pipe.

Between the pipes 1 and 2 is a main body member 3, provided with a threaded nipple 4 for attaching the same to the supply pipe 1 and having a tapped out recess 5 for receiving the nozzle 2. The interior of the body member is provided with a chamber 6, the upper part of which communicates through passage 7 with the nozzle, while the lower part has a passage 6 communicating with the supply pipe. The lower part of this chamber is provided with a separate valve seat 10 of relatively hard material, the seating surface of which is disposed at an angle of approximately 30° with respect to the vertical. Co-acting with this valve seat 10 is a valve member 11 having a conical end of slightly lesser angle than the valve seat, In practice, this conical end is approximately 28°, thereby providing a hair-line contact or bearing with seat 10 which insures a more efficient, reliable and tightly closing action to the passage of oil than could be obtained by means of a ball valve or a valve not possessing this desired wedging action. The valve is mounted at the lower end of a stem 12 and normally held in closed position by means of a coil spring surrounding the stem and acting upon the head of the valve and re-acting upon a nut or cap member 14 screwed into the top of the body member 3. This spring is so designed to give a predetermined pressure of a sufficient amount to overcome any vacuum built up in the cylinders while drifting. It will be noted that this valve stem is provided with a plurality of grooves 15 which prevent the accumulation of fluid leakage under pressure in the bored portion of the nut 14 which leakage might otherwise prevent freedom of operation of the valve under working conditions.

The method of operation, construction and use of this device will be so clear from the above disclosure to those skilled in the art that a further statement thereof is believed to be unnecessary.

The invention is reliable, practical and efficient in use and well adapted to accomplish among others all of the objects and advantages herein set forth.

I claim:

1. A check valve for lubricating systems or the like comprising a casing having inlet and outlet passages, a valve chamber within said casing, a hardened metal valve seat whose sides are angularly disposed, a pressure-operable valve in said chamber yieldingly held against said valve seat, said valve having its axis at substantially a right angle to said passages and its co-acting face so disposed at an angle less than the angle of the seating surface of said valve seat as to afford a single hair line contact therewith.

2. A check valve for lubricating systems or the like comprising a casing having an inlet passage and an outlet passage and a valve chamber in communication with said passages, said chamber having an angularly disposed valve seat, a pressure operable valve movable in said chamber along an axis at substantially a right angle to said passages, and said valve having a seat engaging face so disposed at an angle less than the angle of said seat as to afford a single hair-line contact therewith.

3. A check valve for lubricating systems or the like comprising a casing having an inlet and outlet port and a valve chamber interposed therebetween, a valve and valve seat in said chamber and having their co-acting surfaces so disposed at slightly different angles as to afford a single hair line contact, said valve being pressure-operable and having its axis substantially at a right angle to said ports, a stem associated with the valve, a nut closing one end of said chamber having a cavity into which said valve stem passes, said stem having a groove adapted to prevent the accumulation of fluid under pressure in the upper part of said cap to permit the free operation of said valve.

In testimony whereof I affix my signature.

FRANK A. GOODFELLOW.